United States Patent
Nakamura et al.

(10) Patent No.: US 8,697,760 B2
(45) Date of Patent: Apr. 15, 2014

(54) PROCESS FOR PRODUCING ZEOLITE FILM, AND ZEOLITE FILM OBTAINED BY THE PROCESS

(75) Inventors: Shinji Nakamura, Nagoya (JP); Makiko Niino, Nagoya (JP); Makoto Miyahara, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/433,081

(22) Filed: Mar. 28, 2012

(65) Prior Publication Data

US 2012/0183759 A1 Jul. 19, 2012

Related U.S. Application Data

(63) Continuation of application No. PCT/JP2010/065571, filed on Sep. 3, 2010.

(30) Foreign Application Priority Data

Sep. 29, 2009 (JP) .................................. 2009-225142

(51) Int. Cl.
- B01J 49/00 (2006.01)
- B01D 53/22 (2006.01)
- B01D 71/02 (2006.01)
- B01D 15/00 (2006.01)

(52) U.S. Cl.
USPC ................ 521/27; 96/8; 96/11; 96/10; 95/45; 210/640; 210/506

(58) Field of Classification Search
USPC ....... 428/220; 427/420; 521/27; 96/8, 10, 11; 95/45; 210/640, 506
See application file for complete search history.

(56) References Cited

U.S. PATENT DOCUMENTS

| 6,953,493 | B2 | 10/2005 | Nakayama et al. |
| 7,014,680 | B2 | 3/2006 | Nakayama et al. |
| 7,909,917 | B2 | 3/2011 | Nonaka et al. |
| 2009/0220414 | A1* | 9/2009 | Mizuno .......................... 423/709 |

FOREIGN PATENT DOCUMENTS

| JP | 2001-097715 A1 | 4/2001 |
| JP | 2003-159518 A1 | 6/2003 |
| JP | 2004-083375 A1 | 3/2004 |
| JP | 2005-053747 A1 | 3/2005 |

(Continued)

OTHER PUBLICATIONS

M.J. den Exter et al., "Separation of Permanent Gases on the All-Silica 8-Ring Clathrasil DD3R," Zeolites and Related Microporous Materials: State of the Art 1994, Studies in Surface Science and Catalysis, vol. 84, 1994, pp. 1159-1166.

(Continued)

Primary Examiner — Michael Bernshteyn
(74) Attorney, Agent, or Firm — Burr & Brown, PLLC

(57) ABSTRACT

A process for producing a zeolite film is provided in which seed crystals thinly adhere to the surface of a support to form a thin and even zeolite film having fewer defects than conventional zeolite films. Also provided is a zeolite film obtained by the producing process. The process for producing the zeolite film comprises: a particle adhesion step of allowing a slurry, where zeolite particles which become seeds are dispersed, to flow down on the surface of a base material by the self-weight of the slurry, so that the zeolite particles adhere to the base material; and a film formation step of immersing the base material, to which the zeolite particles adhere, into a sol to carry out hydrothermal synthesis, thereby forming the zeolite film on the base material.

20 Claims, 5 Drawing Sheets

(56) References Cited

FOREIGN PATENT DOCUMENTS

| JP | 2005053747 | A | * | 3/2005 |
| JP | 2007-061775 | A1 | | 3/2007 |
| JP | 2007-203241 | A1 | | 8/2007 |
| JP | 2007203241 | A | * | 8/2007 |
| JP | 2007203324 | A | * | 8/2007 |
| JP | 2008-074695 | A1 | | 4/2008 |
| JP | 2008-285365 | A1 | | 11/2008 |
| JP | 2008285365 | A | * | 11/2008 |

OTHER PUBLICATIONS

International Search Report and Written Opinion dated Nov. 30, 2010.

* cited by examiner

EXAMPLE 1 (CUTOUT SECTION BY FLOW-DOWN METHOD)

COMPARATIVE EXAMPLE 2 (CUTOUT SECTION BY SEED DISPERSION METHOD)

EXAMPLE 1 (GLASS INTERFACE PART BY FLOW-DOWN METHOD)

←— GLASS ——→|←— DDR FILM —→

COMPARATIVE EXAMPLE 1 (GLASS INTERFACE PART BY FILTERING METHOD)

←—→|←——— EXPOSED BASE MATERIAL ———→
GLASS

PROCESS FOR PRODUCING ZEOLITE FILM, AND ZEOLITE FILM OBTAINED BY THE PROCESS

BACKGROUND OF THE INVENTION

1. Field of the Invention

The present invention relates to a process for producing a zeolite film, and a zeolite film obtained by the producing process.

2. Description of Related Art

There are present a large number of kinds (types) of zeolites having different crystal structures, for example, LTA, MFI, MOR, FER, FAU and DDR. It is known that, for example, the deca-dodecasil 3R (DDR) type zeolite is formed by a polyhedron containing a main component of silica and including pores made of eight-membered ring oxygen and having pore diameters of 4.4×3.6 angstroms. Since the DDR type zeolite has such small pore diameters, it is possible to selectively adsorb comparatively small molecules of carbon dioxide ($CO_2$), methane ($CH_4$) and ethane ($C_2H_6$), so that use applications of the zeolite are expected to be a gas separation film which can selectively separate these molecules, an adsorber, and the like.

There is known a method in which a raw material solution, where zeolite powder which becomes seed crystals, is dispersed, and an appropriate support material for forming a film are placed into a container or the like to carry out hydrothermal synthesis (Patent Document 1). Moreover, as a method of loading seed crystals onto the surface of a support and carrying out hydrothermal synthesis to produce a zeolite film which does not have any defect and which has an even thickness, there is known a method of filtering a slurry containing the seed crystals through a porous support (Patent Documents 2 and 3).

PRIOR ART DOCUMENTS

Patent Documents

Patent Document 1: JP-A-2003-159518
Patent Document 2: JP-A-2001-97715
Patent Document 3: JP-A-2008-74695

However, according to a conventional process for producing a zeolite film, it has been difficult to form an evenly thin film. According to a seed dispersion method of Patent Document 1, a liquid obtained by dispersing seeds in an aqueous solution is used. Therefore, a base material is penetrated by seeds, and the seeds adhere to the interior of the base material and then adhere to the surface of the base material. In consequence, seed crystals are thickly formed in the base material, which lowers a flux (a permeation speed becomes low).

According to the filtering method of Patent Documents 2 and 3, an equipment such as a pump for filtering is required. Additionally, the seeds do not easily adhere to a portion where any differential pressure is not generated (e.g., around a seal interface). When the seeds adhere to a base material in which holes are made like those in a lotus root, a difference in vacuum degree is made between an inner cell and an outer cell. Therefore, a difference in amount of the adhesion of the zeolite film is made between the inner cell and the outer cell.

A theme of the present invention lies in that there is provided a process for producing a zeolite film in which seed crystals thinly adhere to the surface of a support to form a thin and even zeolite film having fewer defects than conventional zeolite films, and a zeolite film obtained by the producing process.

SUMMARY OF THE INVENTION

The present inventors have found that when a slurry, where zeolite particles which become seeds are dispersed, is allowed to flow down by the self-weight of the slurry, the zeolite particles adhere to a base material, and the above theme can be solved. According to the present invention, there are provided the following process for producing a zeolite film, and a zeolite film obtained by the producing process.

According to a first aspect of the present invention, a process for producing a zeolite film is provided, comprising: a particle adhesion step of allowing a slurry, where zeolite particles, which become seeds are dispersed, to flow down on the surface of a base material by the self-weight of the slurry, so that the zeolite particles adhere to the base material; and a film formation step of immersing the base material, to which the zeolite particles adhere, into a sol to carry out hydrothermal synthesis, thereby forming the zeolite film on the base material.

According to a second aspect, the process for producing the zeolite film according to the first aspect is provided, wherein the zeolite particles are made of a DDR type zeolite.

According to a third aspect, the process for producing the zeolite film according to the above second aspect is provided, wherein in the film formation step, the sol has a content ratio between 1-adamantane amine and $SiO_2$ (1-adamantane amine/$SiO_2$) in a range of 0.002 to 0.5 by molar ratio, and has a content ratio between water and $SiO_2$ (water/$SiO_2$) in a range of 10 to 500 by molar ratio.

According to a fourth aspect, the process for producing the zeolite film according to any one of the first to third aspects is provided, wherein in the particle adhesion step, a solvent to disperse the zeolite particles is water.

According to a fifth aspect, the process for producing the zeolite film according to any one of the first to third aspects is provided, wherein in the particle adhesion step, a solvent to disperse the zeolite particles is an organic solvent or an aqueous solution of the organic solvent.

According to a sixth aspect, the process for producing the zeolite film according to any one of the first to third aspects is provided, wherein in the particle adhesion step, a solvent to disperse the zeolite particles is ethanol or an aqueous ethanol solution.

According to a seventh aspect, the process for producing the zeolite film according to any one of the first to sixth aspects is provided, wherein in the particle adhesion step, a concentration of a solid content in the slurry is 1 mass % or lower.

According to an eighth aspect, the process for producing the zeolite film according to any one of the first to seventh aspects is provided, wherein in the particle adhesion step, the slurry is allowed to flow down after a masking treatment of the surface of the base material excluding the surface thereof to which the zeolite particles adhere.

According to a ninth aspect, the process for producing the zeolite film according to any one of the first to eighth aspects is provided, wherein in the particle adhesion step, a step of allowing the slurry containing the zeolite particles which become the seeds to flow down is performed a plurality of times.

According to a tenth aspect, the process for producing the zeolite film according to the ninth aspect is provided, wherein the particle adhesion step includes a step of allowing the slurry containing the zeolite particles which become the seeds to flow down, vertically inverting the base material, and then allowing the slurry containing the zeolite particles to flow down.

According to an eleventh aspect, the process for producing the zeolite film according to any one of the first to tenth aspects is provided, further comprising: a forced-air drying step after allowing the slurry containing the zeolite particles which become the seeds to flow down.

According to a twelfth aspect, the process for producing the zeolite film according to the eleventh aspect is provided, wherein the forced-air drying step is performed in humidified air.

According to a thirteenth aspect, the process for producing the zeolite film according to any one of the first to twelfth aspects is provided, further comprising a step of exposure to steam, after allowing the slurry containing the zeolite particles which become the seeds to flow down and performing forced-air drying.

According to a fourteenth aspect, a zeolite film obtained by the process for producing the zeolite film according to any one of the first to thirteenth aspects is provided, and having a film thickness of 10 μm or smaller.

The present invention is a process of allowing a slurry to flow down on the surface of a base material by the self-weight of the slurry so as to come in contact with the base material, thereby adhering zeolite particles (seed particles) to the base material. Equipment such as a pump or a vacuum chamber for use in a filtering method is not required, and hence, the equipment can be simplified. Moreover, seeds can adhere even to a portion where a differential pressure is not easily generated or the seeds cannot easily adhere by the filtering method (e.g., a glass seal interface around an end surface of the base material, or the like). The seeds do not penetrate the interior of the base material, but can adhere only to the surface thereof. Therefore, a thickness of the portion to be provided with the seed particles can be decreased, and eventually, it is possible to form a dense zeolite film having a small film thickness. A sufficient permeation speed can be obtained.

DETAILED DESCRIPTION OF THE INVENTION

Hereinafter, embodiments of the present invention will be described with reference to the drawings. The present invention is not limited to the following embodiments, and changes, modifications and improvements can be added thereto without departing from the scope of the invention.

A process for producing a zeolite film of the present invention includes a particle adhesion step of allowing a slurry, where zeolite particles which become seeds are dispersed, to flow down on the surface of a base material by the self-weight of the slurry, so that the zeolite particles adhere to the base material; and a film formation step of immersing the base material, to which the zeolite particles adhere, into a sol to carry out hydrothermal synthesis, thereby forming the zeolite film on the base material. The flow-down in the particle adhesion step indicates that the slurry is allowed to freely fall down on the base material by the self-weight of the slurry, and the slurry flows on the surface of the substrate. In the flow-down method, for example, the slurry is poured into cylindrical holes made in the base material, whereby a large amount of liquid flows in parallel with the surface thereof. In this case, the slurry which has flowed down flows on the surface of the base material by the self-weight thereof. In consequence, less slurry infiltrates into the base material. On the other hand, a heretofore known drop-down method is, for example, a method of dropping a small amount of slurry down vertically from a flat plate, and the dropped slurry infiltrates into the flat plate by the self-weight thereof. In consequence, a film thickness increases.

Figure 2:
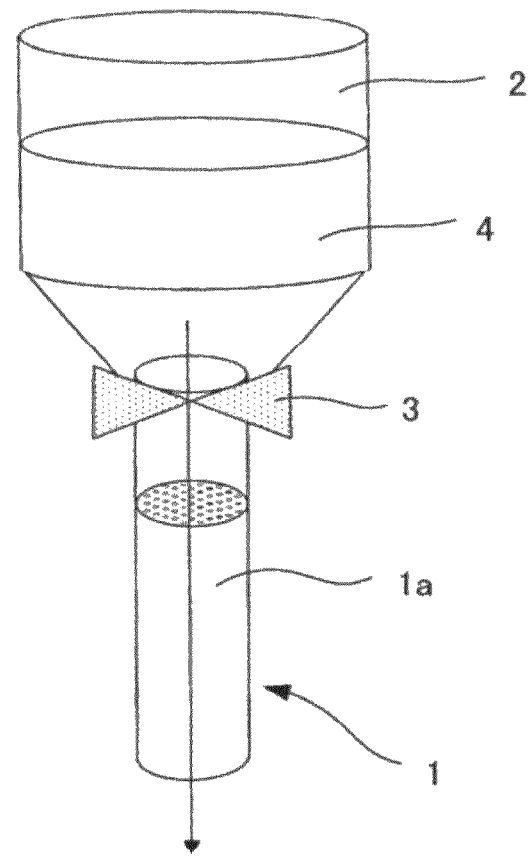
FIG. 2 is an exemplary diagram for explaining seed adhesion by the flow-down method.
Figure 3:
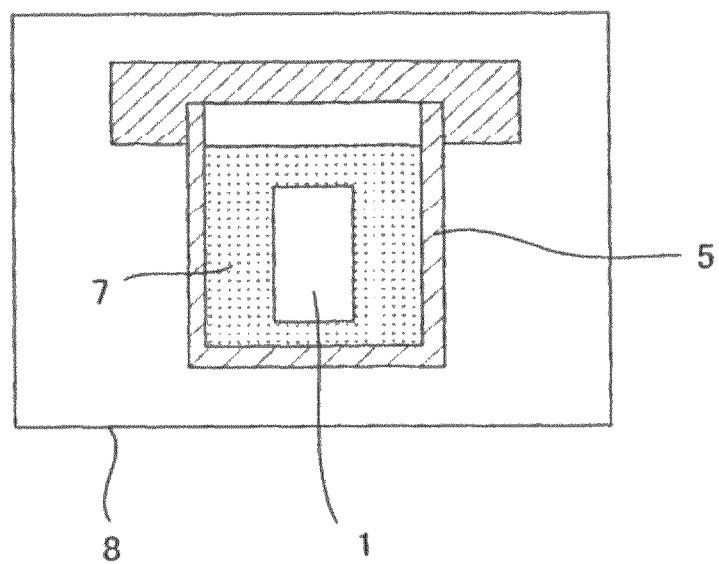
FIG. 3 is an exemplary diagram for explaining hydrothermal synthesis.

FIG. 2 shows an embodiment of seed adhesion (a particle adhesion step) by the flow-down method. A base material 1 is secured to a lower end of a wide-mouth funnel 2, and a valve 3 is opened to pour a slurry 4 through an upper part of the base material 1, so that the slurry can pass through cells. The particle adhesion step can thus be performed. Moreover, FIG. 3 shows an embodiment of a film formation step of immersing the base material 1 into a sol 7 and carrying out hydrothermal synthesis to form the zeolite film on the base material 1. The base material 1 is placed into a heat resistant container 5, and the sol 7 is placed, to carry out a heating treatment (the hydrothermal synthesis), whereby the zeolite film can be produced. It is to be noted that the sol 7 (a raw material solution) contains a structure-directing agent (e.g., 1-adamantane amine), silica ($SiO_2$), water, and the like. As described later, a content ratio between 1-adamantane amine and $SiO_2$ (1-adamantane amine/$SiO_2$) is preferably from 0.002 to 0.5 by molar ratio, and a content ratio between water and $SiO_2$ (water/$SiO_2$) is preferably from 10 to 500 by molar ratio.

In the seed adhesion (the particle adhesion step), a concentration of a solid content in the slurry 4 is preferably in a range of 0.00001 to 1 mass %, more preferably in a range of 0.0001 to 0.5 mass %, and further preferably in a range of 0.0005 to 0.2 mass %. When the concentration is lower than a lower limit value of the concentration range, the number of steps increases, which causes high cost. Moreover, if the concentration exceeds 1 mass %, a thick zeolite particle layer is formed on the surface of the base material. The thick film causes a low flux.

For the slurry 4 of the particle adhesion step, water can be used as a solvent to disperse zeolite particles. Moreover, an organic solvent or an aqueous solution of the organic solvent can be used. Furthermore, ethanol, an aqueous ethanol solution or the like can be used. Especially in a case where the solvent is ethanol having a high volatility, immediately after the liquid flows down, the interior of the base material is pressurized by volatilized ethanol. Therefore, the liquid which has flowed down is pushed out to the surface of the base material, and an amount of the infiltration of the slurry for seed adhesion can further be decreased. Furthermore, when the masking of an outer peripheral portion 1a of the base material 1 with a seal tape is performed and the seed sol using ethanol as the solvent is also used, the amount of the infiltration of the slurry 4 for seed adhesion can further be decreased.

In the particle adhesion step, a step of allowing the slurry 4 containing the zeolite particles which become the seeds to flow down (FIG. 2) is preferably performed a plurality of times. The plurality of times is from about twice to ten times. With the number of the times exceeding this range, an amount of operation is large, and much cost is required. The number of the times is preferably about eight times at maximum, and more preferably from about twice to six times. When the step is performed the plurality of times, the zeolite particles can evenly adhere to the whole surface of the base material 1.

The process for producing the zeolite film of the present invention preferably includes a step of allowing the slurry 4 containing the zeolite particles which become the seeds to flow down, vertically inverting the base material 1, and then allowing the slurry 4 containing the zeolite particles to flow down. In this case, the zeolite particles can evenly adhere to the whole surface of the base material 1.

Moreover, when the slurry 4 containing the zeolite particles which become the seeds is allowed to flow down, the outer peripheral portion 1a of the base material 1 is preferably masked with the seal tape or the like. When the masking is performed, the amount of the infiltration of the slurry 4 for seed adhesion can be decreased, and the zeolite particles can more evenly adhere. When the amount of the infiltration of the slurry 4 for seed adhesion is decreased, it is possible to form a thinner zeolite film.

The process for producing the zeolite film of the present invention preferably includes a forced-air drying step after allowing the slurry 4 containing the zeolite particles which become the seeds to flow down. The forced-air drying is to circulate air through the surface of the base material 1 to which the slurry 4 containing the zeolite particles adhere, thereby drying the slurry 4. When the forced-air drying is performed, a drying speed rises. With the movement of a liquid when the liquid evaporates, the zeolite particles can move to easily gather on the surface.

Moreover, the forced-air drying is preferably performed with humidified air. When the forced-air drying is performed with the humidified air, the seeds can more strongly be secured onto the base material 1. When the seeds are strongly secured onto the base material 1, the detachment of the zeolite particles during the subsequent hydrothermal synthesis can be prevented. It is possible to stably prepare the zeolite film having fewer defects. It is to be noted that the process includes an exposure step of exposing, into steam, the base material 1 subjected to the forced-air drying with air which is not humidified after the forced-air drying, after allowing the slurry 4 to flow down so that the seeds adhere. Also in this case, a similar effect can be obtained.

The process for producing the zeolite film of the present invention can be applied to zeolites having crystal structures such as LTA, MFI, MOR, FER, FAU and DDR. In the present description, there will be described an example where the zeolite particles are made of a DDR type zeolite. Hereinafter, the embodiment of the process for producing the zeolite film in the case of the DDR type zeolite will specifically be described with reference to FIG. 1.

[1] Preparation of Slurry Liquid for Seed Adhesion, and Seed Adhesion (Particle Adhesion Step)

DDR type zeolite crystal powder is produced. This powder is used as it is. If necessary, the powder is ground, and used as seed crystals. The DDR type zeolite powder (this becomes the seed crystals) is dispersed in the solvent to prepare the slurry 4 (the slurry liquid for seed adhesion). The slurry liquid for seed adhesion is preferably diluted with the solvent so that the concentration of the solid content included in this liquid is 1 mass % or lower. The solvent for the diluting is water or ethanol, or is preferably the aqueous ethanol solution. As the solvent for use in the diluting, an organic solvent such as acetone or IPA or an aqueous solution of the organic solvent can be used, in addition to the water or ethanol. When the organic solvent having a high volatility is used, a drying time can be shortened. Moreover, the amount of the infiltration of the slurry 4 for seed adhesion can be decreased. Therefore, it is possible to form a thinner zeolite film. As a method of dispersing the DDR type zeolite powder in the slurry liquid, a usual stirring method may be employed, but a method such as an ultrasonic treatment may be employed.

Figure 1:
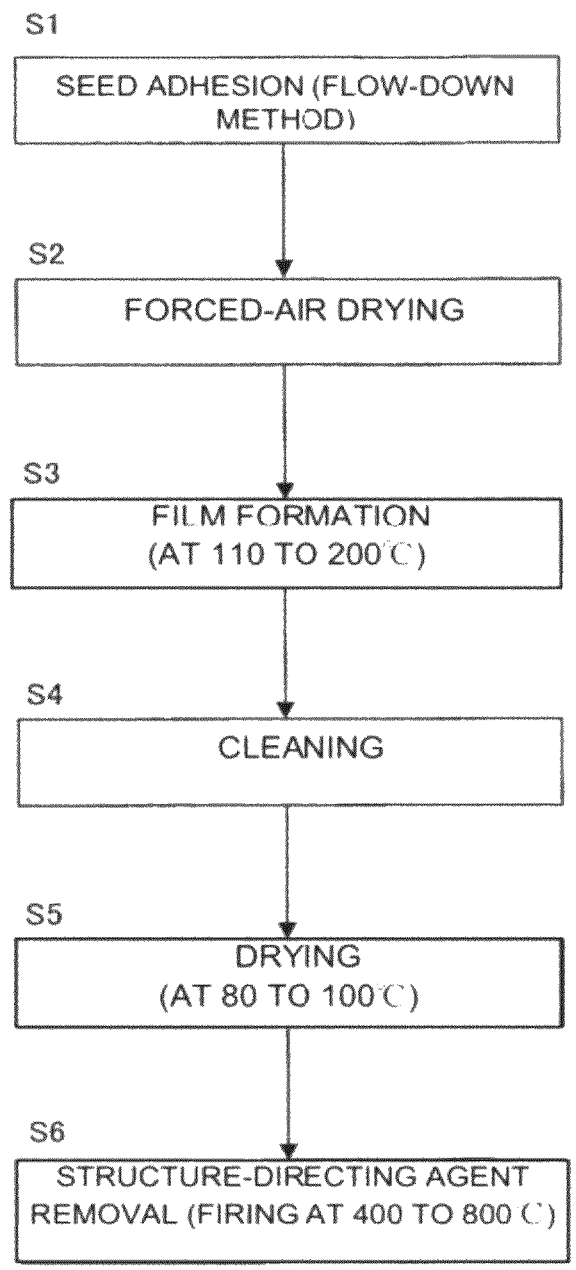
FIG. 1 is a flowchart for explaining a process for producing a zeolite film by a flow-down method.

Next, there is performed a particle adhesion step of allowing the slurry 4, where the zeolite particles which become the seeds are dispersed, to flow down by the self-weight of the slurry, so that the zeolite particles adhere to the base material 1 (S1 of FIG. 1). As the base material 1 which becomes a support, a nonporous material or a porous material can be used. As the support, it is possible to suitably use the nonporous or porous material made of a ceramic such as alumina, zirconia or mullite, glass, zeolite, clay, metal, carbon, an organic polymer (e.g., a fluorine resin) or the like.

When the porous base material 1 having a honeycomb shape (holes (cells) are made like holes in a lotus root) is used, as shown in FIG. 2, the base material 1 is secured to the lower end of the wide-mouth funnel 2, and the slurry 4 for seed adhesion is poured through the upper part of the base material 1 to pass through the cells, whereby the seeds can adhere. It is to be noted that when the slurry flows down, the outer peripheral portion 1a of the base material 1 is masked with the seal tape or the like. In consequence, the amount of the infiltration of the slurry 4 for seed adhesion can further be small and even.

Next, the base material 1 through which the slurry 4 has flowed down is subjected to the forced-air drying at room temperature to 120° C. with an air velocity of 1 to 10 m/s for 30 to 60 minutes (S2 of FIG. 1). Then, the slurry 4 for seed adhesion is again allowed to flow down through the base material 1. When the flow-down of the slurry 4 for seed adhesion and the forced-air drying are repeated twice to six times, the seeds can evenly adhere to the surface of the base material 1. When ethanol or a volatile solvent or an aqueous solution thereof is used as the solvent of the slurry, the forced-air drying can be performed in a shorter period of drying time.

The base material 1 to which the seeds adhere is subjected to the forced-air drying with the humidified air, or the steam exposure after the forced-air drying, whereby the seeds can more strongly be secured onto the base material 1. When the forced-air drying is performed with the humidified air, the drying is preferably performed with an absolute humidity of 10 g/m$^3$ or higher. In the case of the exposure to the steam, the exposure is preferably performed in an environment with an absolute humidity of 25 g/m$^3$ or higher for ten minutes or longer. With the absolute humidity of 25 g/m$^3$, the detachment of the zeolite particles during the subsequent hydrothermal synthesis can be prevented, and the zeolite film having fewer defects can stably be prepared. The detached zeolite particles are deposited on a bottom part of the hydrothermal synthesis container, a jig and the like, which causes damage to the jig sometimes. Therefore, an amount of the zeolite particles to be detached is preferably as small as possible.

[2] Preparation of Raw Material Solution (Sol)

Next, there is prepared a raw material solution having a predetermined composition containing 1-adamantane amine dissolved in ethylenediamine.

1-adamantane amine is a structure-directing agent (SDA) in the synthesis of the DDR type zeolite, i.e., a substance which becomes a casting mold to form a crystal structure of the DDR type zeolite, and hence a molar ratio thereof to silica ($SiO_2$) which is a raw material of the DDR type zeolite is important. The 1-adamantane amine/$SiO_2$ molar ratio needs to be in a range of 0.002 to 0.5, is preferably in a range of 0.002 to 0.2, and is further preferably in a range of 0.002 to 0.03. If the 1-adamantane amine/$SiO_2$ molar ratio is smaller than this range, 1-adamantane amine of the SDA is running short, and it is difficult to form the DDR type zeolite. On the other hand, if the ratio exceeds this range, expensive 1-adamantane amine is added more than necessary, which is unfavorable from the aspect of producing cost.

1-adamantane amine is hardly soluble in the water which is the solvent of the hydrothermal synthesis. Therefore, the substance is dissolved in ethylenediamine, and then used in the preparation of the raw material solution. When 1-adamantane amine is completely dissolved in ethylenediamine to prepare the raw material solution having an even state, it is possible to form the DDR type zeolite having an even crystal size. A molar ratio of ethylenediamine/1-adamantane amine needs to be in a range of 4 to 35, is preferably in a range of 8 to 24, and is further preferably in a range of 10 to 20. If the ethylenediamine/1-adamantane amine molar ratio is smaller than this range, an amount of ethylenediamine is not sufficient for completely dissolving 1-adamantane amine. On the other hand, if the ratio exceeds this range, ethylenediamine is used more than necessary, which is unfavorable from the aspect of the producing cost.

In the producing process of the present invention, colloidal silica is used as a silica source. As colloidal silica, commercially available colloidal silica can suitably be used. However, colloidal silica can be prepared by dissolving fine powder silica in water or hydrolyzing alkoxide.

A molar ratio between water and silica ($SiO_2$) contained in the raw material solution (the water/$SiO_2$ molar ratio) needs to be in a range of 10 to 500, is preferably in a range of 14 to 250, and is further preferably in a range of 14 to 112. If the water/$SiO_2$ molar ratio is smaller than this range, a concentration of $SiO_2$ in the raw material solution is excessively high, which is not preferable in that a large amount of non-crystallized non-reacted $SiO_2$ remains. If the ratio exceeds this range, the concentration of $SiO_2$ in the raw material solution is excessively low, which is not preferable in that the DDR type zeolite cannot be formed.

According to the producing process of the present invention, it is possible to produce a DDR type zeolite containing aluminum and metal cations in a framework thereof (hereinafter referred to as "the low-silica DDR type zeolite"), in addition to an all-silica DDR type zeolite. This low-silica DDR type zeolite includes cations in pores, and is different from the all-silica DDR type zeolite in adsorption performance and catalyst performance. When the low-silica DDR type zeolite is produced, in addition to the water as the solvent and the colloidal silica as the silica source, an aluminum source and a cation source are added to prepare the raw material solution.

As the aluminum source, aluminum sulfate, sodium aluminate, metal aluminum or the like can be used. In the case of conversion using aluminum oxide, an $SiO_2/Al_2O_3$ molar ratio needs to be in a range of 50 to 1000, is preferably in a range of 70 to 300, and is further preferably in a range of 90 to 200. If the $SiO_2/Al_2O_3$ molar ratio is smaller than this range, a ratio of amorphous $SiO_2$ other than the DDR type zeolite unfavorably becomes large. On the other hand, if the ratio exceeds this range, the DDR type zeolite can be produced. However, the amounts of aluminum and cations become remarkably small, and hence the low-silica DDR type zeolite cannot exert its properties, and unfavorably is not different from the all-silica zeolite at all.

Examples of the cations include cations of an alkali metal such as K, Na, Li, Rb or Cs. In the case of Na, examples of the cation source include sodium hydroxide and sodium aluminate. In the case of conversion using an oxide of the alkali metal, an $X_2O/Al_2O_3$ molar ratio needs to be in a range of 1 to 25, is preferably in a range of 3 to 20, and is further preferably in a range of 6 to 15. If the $X_2O/Al_2O_3$ molar ratio is smaller than this range, the DDR type zeolite having a desired $SiO_2/Al_2O_3$ molar ratio unfavorably is not easily obtained. On the other hand, if the ratio exceeds this range, amorphous $SiO_2$ is unfavorably mixed into a product.

The preparation of the raw material solution has been described above, but examples of an especially preferable configuration include a method in which a solution obtained by dissolving 1-adamantane amine in ethylenediamine, water as the solvent and colloidal silica (further aluminum sulfate as the aluminum source and sodium hydroxide as the cation source, when low-silica type DDR is synthesized) are mixed at a predetermined ratio, and dissolved to prepare the raw material solution.

[3] Film Formation [Film Formation Step]

A container into which the raw material solution is placed (e.g., a wide-mouth jar) is set in a homogenizer, followed by stirring, to prepare the sol 7 for use in the hydrothermal synthesis. Next, as shown in FIG. 3, the base material 1 to which the seeds adhere by the flow-down method is placed into the heat resistant container 5. Furthermore, after placing the prepared sol 7 into the container, the container is placed into a drier 8, to carry out a heating treatment (the hydrothermal synthesis) at 110 to 200° C. for 16 to 120 hours, thereby producing a zeolite film (S3 of FIG. 1).

A temperature of the heating treatment (the synthesis temperature) is preferably in a range of 110 to 200° C., further preferably in a range of 120 to 180° C., and especially preferably in a range of 120 to 170° C. If the temperature of the heating treatment is lower than this range, the DDR type zeolite unfavorably cannot be formed. On the other hand, if the temperature exceeds this range, a DOH type zeolite which is not desired is unfavorably formed owing to phase transition.

As the time of the heating treatment (the synthesis time) in the producing process of the present invention, a remarkably short time of several hours to five days is sufficient. In the producing process of the present invention, the DDR type zeolite powder is added to the base material by the flow-down method, and hence the crystallization of the DDR type zeolite is promoted.

In the producing process of the present invention, it is not necessary to constantly stir the raw material solution (the sol 7) during the heating treatment. Since 1-adamantane amine to be contained in the raw material solution is dissolved in ethylenediamine, the raw material solution is held in an even state. It is to be noted that in a conventional process, if the raw material solution is not stirred, mixed crystals of DDR and DOH are formed sometimes. However, according to the producing process of the present invention, even if the raw material solution is not constantly stirred, any DOH is not formed, and single-phase crystals of DDR can be formed.

[4] Cleaning/Structure-Directing Agent Removal

Next, the base material 1 provided with the zeolite film is water-washed, or boil-cleaned at 80 to 100° C. (S4 of FIG. 1). The base material is removed, and dried at 80 to 100° C. (S5 of FIG. 1). Then, the base material 1 is placed into an electric furnace, and heated in the atmosphere at 400 to 800° C. for one to 200 hours, to burn and remove 1-adamantane amine in the pores of the zeolite film (S6 of FIG. 1). As described above, it is possible to form a thin and even zeolite film having fewer defects than conventional films and having a film thickness of 10 μm or smaller.

EXAMPLES

Hereinafter, the present invention will be described in more detail on the basis of examples, but the present invention is not limited to these examples.

Examples 1 to 26

(1) Preparation of Seed Crystals

On the basis of a process for producing a DDR type zeolite as disclosed by M. J. den Exter, J. C. Jansen and H. van Bekkum, Studies in Surface Science and Catalysis vol. 84, Ed. by J. Weitkamp et al., Elsevier (1994) 1159-1166 or JP-A-2004-083375, DDR type zeolite crystal powder was produced. This powder was used as it is. If necessary, the powder was ground and used as seed crystals. The synthesized or ground seed crystals were dispersed in water, and coarse particles were removed therefrom, to prepare a seed crystal dispersion liquid.

(2) Seed Adhesion (Particle Adhesion Step)

The seed crystal dispersion liquid prepared in (1) was diluted with ion exchange water or ethanol, adjusted so that a DDR concentration was from 0.001 to 0.36 mass % (a solid content concentration in a slurry 4), and stirred at 300 rpm by a stirrer, thereby obtaining a slurry liquid for seed adhesion (the slurry 4). A porous base material 1 (provided with holes like holes in a lotus root, having a diameter of 30 mm and a length of 160 mm, and including glass seals at both ends) was secured to the lower end of a wide-mouth funnel 2, and 160 ml of slurry liquid for seed adhesion was poured through an upper part of the base material 1 to pass through cells (see FIG. 2). As to the base materials 1 in part of the examples, an outer peripheral portion 1a of the material was masked with a teflon tape, and then seeds adhered thereto (Examples 9 to 26). As to the base material 1 through which the slurry 4 flowed down, the interior of each cell was subjected to forced-air drying on conditions of room temperature or 80° C. and an air velocity of 3 to 6 m/s for 10 to 30 min. The flow-down of the slurry 4 and the forced-air drying were repeated once to six times to obtain samples. In Example 15, air was not humidified during the forced-air drying (an absolute humidity of the air: 3 g/m$^3$). In Example 16, air was humidified during the forced-air drying, and the absolute humidity of the air for use in the forced-air drying was 12 g/m$^3$. Moreover, in Examples 19 to 26, a steam exposure step was performed to expose the base material 1 subjected to the forced-air drying and provided with seeds in an environment with an absolute humidity of 23 to 36 g/m$^3$ for 30 minutes to 50 hours, to perform a steam exposure treatment. After drying, the observation of a fine structure was performed with an electron microscope. It has been confirmed that DDR particles adhere to the surface of the base material 1 on the conditions of the examples.

(3) Film Formation (Film Formation Step)

After placing 7.35 g of ethylenediamine (manufactured by Wako Pure Chemical Industries, Ltd.) into a 100 ml wide-mouth jar made of a fluorine resin, 1.156 g of 1-adamantane amine (manufactured by Aldrich) was added and dissolved so that the precipitation of 1-adamantane amine did not remain. Into another container 98.0 g of 30 mass % of colloidal silica (Snowtex S manufactured by Nissan Chemical Industries, Ltd.) and 116.55 g of ion exchange water were placed, lightly stirred, added to the wide-mouth jar in which ethylenediamine and 1-adamantane amine were mixed, and then strongly shaken, to prepare a raw material solution. Molar ratios of the respective components of the raw material solution were 1-adamantane amine/SIC$_2$=0.016 and water/ SIC$_2$=21. In Examples 13 and 14, adjustment was performed so that molar ratios of components of raw material solutions became 1-adamantane amine/SiO$_2$=0.004 and 0.47 and water/SiO$_2$=15 and 168, and the raw material solutions were prepared by a similar method. Afterward, the wide-mouth jar into which the raw material solution was placed was set in a homogenizer, and stirred for one hour. In a stainless steel heat resistant container 5 provided with an inner cylinder having an inner volume of 300 ml and made of a fluorine resin, the base material 1 to which DDR particles adhered in (2) was disposed. A prepared raw material solution (a sol 7) was placed into the container, and a heating treatment (hydrothermal synthesis) was carried out at 120 to 170° C. for 16 to 84 hr. (see FIG. 3). When a cutout section of the base material 1 provided with the film was observed with a scanning electron microscope, a film thickness of the DDR film was 10 μm or smaller. It was possible to confirm that the DDR film prepared in the example had a sufficiently small film thickness as compared with the film prepared in Comparative Example 2 described hereinafter.

(4) He Permeation Amount Measurement

To check the presence/absence of defects of the film, the film was formed, cleaning and drying (80° C.) were performed, and then an amount of He permeation was measured. It has been confirmed that on conditions of the examples, the amount of He permeation became a measurement limit or smaller (<0.018 L/min·m$^2$·kPa) and the whole surface could be covered.

(5) Structure-Directing Agent Removal

The film which could be covered was heated with an electric furnace in the atmosphere at 450 or 500° C. for 50 hours, to burn and remove 1-adamantane amine in pores. Through X-ray diffraction, a crystal phase was identified, and a DDR type zeolite was confirmed. Afterward, a fine structure was observed with the electron microscope.

(6) X-Ray Diffraction

The crystal phase of the obtained film was checked through the X-ray diffraction, to evaluate the crystal phase. Then, only diffraction peaks of the DDR type zeolite and alumina which was the base material 1 were detected. It is to be noted that "the diffraction peak of the DDR type zeolite" in the X-ray diffraction is a diffraction peak disclosed in No. 38-651 or 41-571 corresponding to decal-dodecasil 3R described in International Center for Diffraction Data (ICDD) "Powder Diffraction File".

(7) Fine Structure Observation

It was confirmed with the electron microscope that after the seed adhesion, the DDR particles adhered to the surface of the base material 1. Moreover, it was confirmed that after the film formation, the base material 1 was covered with DDR. Furthermore, it was possible to confirm from SEM structure of the cutout section that the film had a sufficiently small film thickness as compared with a film prepared by a seed dispersion method.

Comparative Example 1

Seeds adhered to a DDR type zeolite film in accordance with a porous base material provided with a seed crystal containing layer for producing a zeolite film, a zeolite film and a process for producing the zeolite film in JP-A-2008-74695 (a filtering method). Afterward, hydrothermal synthesis was carried out by use of a sol 7 similar to that prepared in Example 1 at 120° C. for 84 hours, to form the film. In the same manner as in the examples, the measurement of an amount of He permeation and the observation of a fine structure with a scanning electron microscope were performed.

Comparative Example 2

The same seed crystals as those used in Example 1 were dispersed in a sol 7 similar to that prepared in Example 1, and hydrothermal synthesis was carried out at 135° C. for 48 hours, to form a film. In the same manner as in the examples, the measurement of an amount of He permeation and the observation of a fine structure with a scanning electron microscope were performed.

The results of the above-mentioned examples and comparative examples are shown in Table 1 to Table 3. It is to be noted that Table 2 distinctively shows Examples 15 and 16 where air is not humidified in a forced-air drying step, and Table 3 distinctively shows Examples 17 to 26 where the forced-air drying step is performed with air which is not humidified, and then steam exposure is not performed.

TABLE 1

| | DDR concentration Mass % | Sol composition (molar ratio) 1-adamantane amine/$SiO_2$ | Sol composition (molar ratio) Water/$SiO_2$ | Synthesis temperature ° C. | Synthesis time h | Solvent | Masking Present/Absent |
|---|---|---|---|---|---|---|---|
| Example 1 | 0.12 | 0.016 | 21 | 120 | 84 | Water | Absent |
| Example 2 | 0.360 | 0.016 | 21 | 135 | 48 | Water | Absent |
| Example 3 | 0.06 | 0.016 | 21 | 135 | 48 | Water | Absent |
| Example 4 | 0.002 | 0.016 | 21 | 135 | 48 | Water | Absent |
| Example 5 | 0.002 | 0.016 | 21 | 150 | 16 | Water | Absent |
| Example 6 | 0.001 | 0.016 | 21 | 160 | 16 | Water | Absent |
| Example 7 | 0.006 | 0.016 | 21 | 170 | 16 | Water | Absent |
| Example 8 | 0.006 | 0.016 | 21 | 150 | 16 | Water | Absent |
| Example 9 | 0.006 | 0.016 | 21 | 150 | 16 | Water | Present |
| Example 10 | 0.006 | 0.016 | 21 | 150 | 16 | Ethanol | Present |
| Example 11 | 0.008 | 0.016 | 21 | 135 | 50 | Ethanol | Present |
| Example 12 | 0.025 | 0.016 | 21 | 135 | 50 | Ethanol | Present |
| Example 13 | 0.048 | 0.004 | 15 | 150 | 72 | Ethanol | Present |
| Example 14 | 0.120 | 0.470 | 168 | 165 | 48 | Ethanol | Present |
| Comparative Example 1 | 0.12 | 0.016 | 21 | 120 | 84 | — | — |
| Comparative Example 2 | 0.002 | 0.016 | 21 | 135 | 48 | — | — |

| | No. of flow-down times Times | Amount of He permeation L/min·$m^2$·kPa | Film thickness (average) μm | Film thickness (width) μm | Glass interface — |
|---|---|---|---|---|---|
| Example 1 | 1 | <0.018 | 2.5 | −1 to +3 | Covered |
| Example 2 | 3 | <0.018 | 1.5 | +4 | Covered |
| Example 3 | 1 | <0.018 | 4 | ±2 | Covered |
| Example 4 | 6 | <0.018 | 5 | ±1 | Covered |
| Example 5 | 6 | <0.018 | 8 | ±1 | Covered |
| Example 6 | 2 | <0.018 | 6 | ±2 | Covered |
| Example 7 | 2 | <0.018 | 2 | +4 | Covered |
| Example 8 | 2 | <0.018 | 7 | ±3 | Covered |
| Example 9 | 2 | <0.018 | 7 | ±1 | Covered |
| Example 10 | 2 | <0.018 | 4 | ≤±0.5 | Covered |
| Example 11 | 2 | <0.018 | 4 | ≤±0.5 | Covered |
| Example 12 | 2 | <0.018 | 3 | ≤±0.5 | Covered |
| Example 13 | 2 | <0.018 | 4 | ≤±0.5 | Covered |
| Example 14 | 2 | <0.018 | 4.5 | ≤±0.5 | Covered |
| Comparative Example 1 | — | Cannot be measured | 2 | — | Base material exposed |
| Comparative Example 2 | — | <0.018 | >20 | — | Covered |

TABLE 2

| | DDR concentration Mass % | Synthesis temperature ° C. | Synthesis time h | Solvent | Masking Present/Absent | No. of flow-down times Times | Forced-air drying Humidification Present/Absent | Forced-air drying Absolute humidity g/$m^3$ |
|---|---|---|---|---|---|---|---|---|
| Example 15 | 0.006 | 135 | 44 | Ethanol | Present | 2 | Absent | 3 |
| Example 16 | 0.006 | 135 | 44 | Ethanol | Present | 2 | Present | 12 |

TABLE 2-continued

|  | Deposited matter | Amount of He permeation L/min·m²·kPa | Film thickness (average) μm | Film thickness (width) μm | Glass interface — |
|---|---|---|---|---|---|
| Example 15 | Present | <0.018 | 3 | ≤±0.5 | Covered |
| Example 16 | None | <0.018 | 3 | ≤±0.5 | Covered |

TABLE 3

|  | DDR concentration Mass % | Synthesis temperature °C | Synthesis time h | Solvent | Masking Present/ Absent | No. of flow-down times Times | Steam exposure Present/ Absent | Time h | Absolute humidity g/m³ |
|---|---|---|---|---|---|---|---|---|---|
| Example 17 | 0.008 | 135 | 53 | Ethanol | Present | 2 | Absent | — | 6 |
| Example 18 | 0.024 | 135 | 35 | Ethanol | Present | 2 | Absent | — | 7 |
| Example 19 | 0.006 | 135 | 50 | Ethanol | Present | 2 | Present | 2 | 23 |
| Example 20 | 0.006 | 135 | 50 | Ethanol | Present | 2 | Present | 50 | 23 |
| Example 21 | 0.006 | 135 | 44 | Ethanol | Present | 2 | Present | 3 | 27 |
| Example 22 | 0.006 | 135 | 44 | Ethanol | Present | 2 | Present | 50 | 27 |
| Example 23 | 0.008 | 135 | 50 | Ethanol | Present | 2 | Present | 4 | 30 |
| Example 24 | 0.060 | 135 | 25 | Ethanol | Present | 2 | Present | 4 | 30 |
| Example 25 | 0.008 | 135 | 53 | Ethanol | Present | 2 | Present | 3 | 36 |
| Example 26 | 0.024 | 135 | 35 | Ethanol | Present | 2 | Present | 0.5 | 36 |

|  | Deposited matter | Amount of He permeation L/min·m²·kPa | Film thickness (average) μm | Film thickness (width) μm | Glass interface — |
|---|---|---|---|---|---|
| Example 17 | Present | <0.018 | 4 | ≤±0.5 | Covered |
| Example 18 | Present | <0.018 | 2 | ≤±0.5 | Covered |
| Example 19 | Present | <0.018 | 4 | ≤±0.5 | Covered |
| Example 20 | Present | <0.018 | 4 | ≤±0.5 | Covered |
| Example 21 | None | <0.018 | 3 | ≤±0.5 | Covered |
| Example 22 | None | <0.018 | 3 | ≤±0.5 | Covered |
| Example 23 | None | <0.018 | 4 | ≤±0.5 | Covered |
| Example 24 | None | <0.018 | 3 | ≤±0.5 | Covered |
| Example 25 | None | <0.018 | 3 | ≤±0.5 | Covered |
| Example 26 | None | <0.018 | 3 | ≤±0.5 | Covered |

Figure 4A:
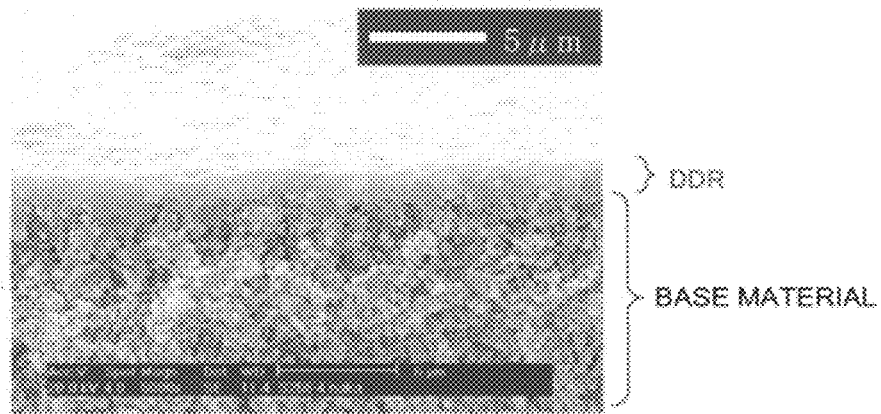
FIG. 4A is a photograph of a cutout section of Example 1 by a scanning electron microscope.
Figure 5A:
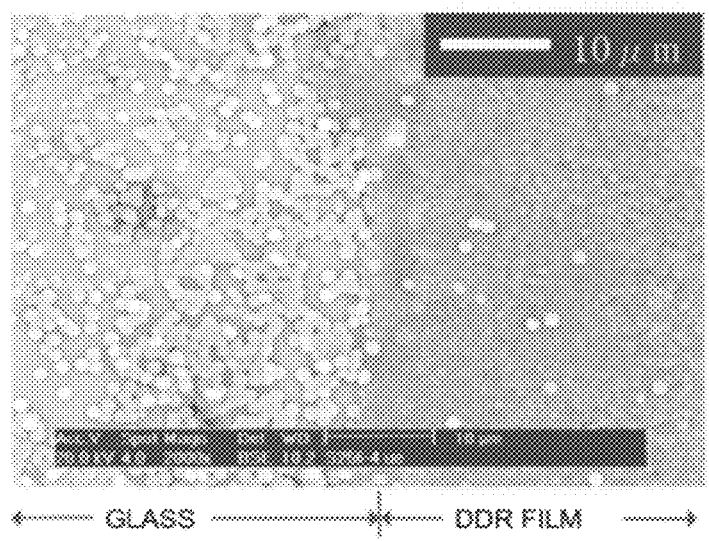
FIG. 5A is a photograph of a glass interface part of Example 1 by the scanning electron microscope.

As shown in Table 1 to Table 3, in Examples 1 to 26, a glass interface was covered, and it was possible to form a thin zeolite film (the DDR film) having a thickness of 2 to 8 μm. FIG. 4A is a photograph of a cutout section of Example 1 after film formation by a scanning electron microscope. It is seen that the DDR film is thinly formed. Moreover, FIG. 5A is a photograph of a glass interface part of Example 1 after the film formation by the scanning electron microscope. It is seen that the whole surface of the base material 1 is covered with the DDR film and that the glass interface part can be covered.

Figure 5B:
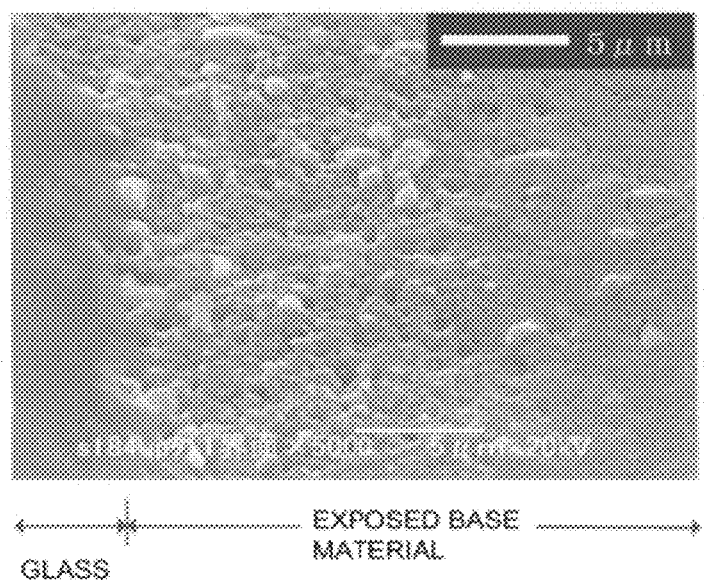
FIG. 5B is a photograph of a glass interface part of Comparative Example 1 by the scanning electron microscope.

On the other hand, when a glass interface of Comparative Example 1 was observed with the scanning electron microscope, about 5 to 10 μm of a base material 1 was exposed and could not be covered between a glass portion and a DDR film. FIG. 5B is a photograph of a glass interface part of Comparative Example 1 after film formation by the scanning electron microscope. It is seen that the base material 1 is exposed and the glass interface part is not covered with the DDR film. Further in Comparative Example 1, the glass interface part is not covered with any film, and hence an amount of He permeation could not be measured.

Figure 4B:
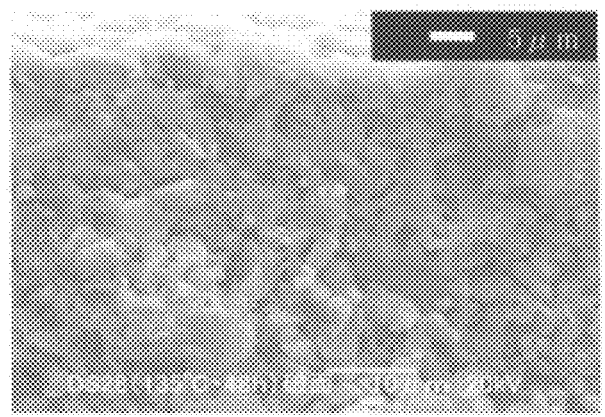
FIG. 4B is a photograph of a cutout section of Comparative Example 2 by the scanning electron microscope.

FIG. 4B is a photograph of a cutout section of Comparative Example 2 after film formation by the scanning electron microscope. All the region of the photograph indicates a mixed layer of a base material 1 and a DDR film, and the DDR film has a film thickness of 20 μm or larger. It is seen that the DDR film is thickly formed as compared with Example 1. In consequence, it was possible to confirm that the DDR films prepared in the examples had a sufficiently small film thickness as compared with the film prepared in Comparative Example 2.

As seen from comparison between Example 8 and Example 9, when a slurry 4 containing zeolite particles which become seeds is allowed to flow down, an outer peripheral portion 1a of a base material 1 is masked with a seal tape or the like, whereby an amount of the infiltration of the slurry 4 for seed adhesion can further be even. As a consequence, it was possible to prepare a zeolite film having less fluctuations in film thickness.

Moreover, as seen from comparison between Example 9 and Example 10, when a solvent of a slurry 4 for seed adhesion is changed from water to ethanol having a high volatility, an amount of the infiltration of the slurry 4 for seed adhesion can be decreased. As a consequence, it was possible to prepare a zeolite film having a smaller film thickness. Moreover, when the ethanol solvent and masking are used together, the amount of the infiltration of the slurry 4 for seed adhesion can further be even. As a consequence, it was possible to prepare a zeolite film having less fluctuations in film thickness.

Further in Examples 15 and 17 to 20, a deposited matter due to the drop-out of the zeolite particles were present during the film formation, but in Examples 16 and 21 to 26, any deposited matter was not present. When the forced-air drying of the base material 1 was performed with air having an absolute humidity of 12 g/m³ or higher after the seed adhesion, or the base material 1 subjected to the forced-air drying after the seed adhesion was exposed into steam having an absolute humidity of 27 g/m³ or higher, it was possible to prevent the detachment of the zeolite particles during the film formation.

INDUSTRIAL APPLICABILITY

The present invention can be utilized as a process for producing a zeolite film for use in a gas separation film, a pervaporation film and the like.

DESCRIPTION OF REFERENCE MARKS

1: base material, 1a: outer peripheral portion (of the base material), 2: funnel, 3: valve, 4: slurry (a slurry liquid for seed adhesion), 5: heat resistant container, 7: sol, and 8: drier.

The invention claimed is:

1. A process for producing a zeolite film comprising:
a particle adhesion step of allowing a slurry, having zeolite seed particles dispersed therein, to flow down onto a surface of a base material, in a direction that is parallel with respect to the surface of the base material, by the self-weight of the slurry, so that the zeolite particles adhere to the surface of the base material; and
a film formation step of immersing the base material, to which the zeolite particles adhere, into a sol to carry out hydrothermal synthesis, thereby forming the zeolite film on the surface of the base material.

2. The process for producing the zeolite film according to claim 1, wherein the zeolite particles are made of a DDR type zeolite.

3. The process for producing the zeolite film according to claim 2, wherein in the film formation step, the sol has a content ratio between 1-adamantane amine and $SiO_2$ (1-adamantane amine/$SiO_2$) in a range of 0.002 to 0.5 by molar ratio, and has a content ratio between water and $SiO_2$ (water/$SiO_2$) in a range of 10 to 500 by molar ratio.

4. The process for producing the zeolite film according to claim 1, wherein in the particle adhesion step, a solvent to disperse the zeolite particles is water.

5. The process for producing the zeolite film according to claim 1, wherein in the particle adhesion step, a solvent to disperse the zeolite particles is an organic solvent or an aqueous solution of the organic solvent.

6. The process for producing the zeolite film according to claim 1, wherein in the particle adhesion step, a solvent to disperse the zeolite particles is ethanol or an aqueous ethanol solution.

7. The process for producing the zeolite film according to claim 1, wherein in the particle adhesion step, a concentration of a solid content in the slurry is 1 mass % or lower.

8. The process for producing the zeolite film according to claim 1, wherein in the particle adhesion step, the slurry is allowed to flow down after a masking treatment of the surface of the base material excluding the surface thereof to which the zeolite particles adhere.

9. The process for producing the zeolite film according to claim 1, wherein in the particle adhesion step, a step of allowing the slurry containing the zeolite particles which become the seeds to flow down is performed a plurality of times.

10. The process for producing the zeolite film according to claim 9, wherein the particle adhesion step includes a step of allowing the slurry containing the zeolite particles which become the seeds to flow down, vertically inverting the base material, and then allowing the slurry containing the zeolite particles to flow down.

11. The process for producing the zeolite film according to claim 1, further comprising: a forced-air drying step after allowing the slurry containing the zeolite particles which become the seeds to flow down.

12. The process for producing the zeolite film according to claim 11, wherein the forced-air drying step is performed in humidified air.

13. The process for producing the zeolite film according to claim 1, further comprising a step of exposure to steam, after allowing the slurry containing the zeolite particles which become the seeds to flow down and performing forced-air drying.

14. A zeolite film obtained by the process for producing the zeolite film according to claim 1 and having a film thickness of 10 µm or smaller.

15. The process for producing the zeolite film according to claim 9,
wherein the particle adhesion step includes a step of allowing the slurry containing the zeolite particles which become the seeds to flow down, vertically inverting the base material, and then allowing the slurry containing the zeolite particles to flow down, and
in the particle adhesion step, a solvent to disperse the zeolite particles is ethanol or an aqueous ethanol solution.

16. The process for producing the zeolite film according to claim 9,
wherein the particle adhesion step includes a step of allowing the slurry containing the zeolite particles which become the seeds to flow down, vertically inverting the base material, and then allowing the slurry containing the zeolite particles to flow down, and
in the particle adhesion step, a concentration of a solid content in the slurry is 1 mass % or lower.

17. The process for producing the zeolite film according to claim 9,
wherein the particle adhesion step includes a step of allowing the slurry containing the zeolite particles which become the seeds to flow down, vertically inverting the base material, and then allowing the slurry containing the zeolite particles to flow down, and
in the particle adhesion step, a solvent to disperse the zeolite particles is water.

18. The process for producing the zeolite film according to claim 9,
wherein the particle adhesion step includes a step of allowing the slurry containing the zeolite particles which become the seeds to flow down, vertically inverting the base material, and then allowing the slurry containing the zeolite particles to flow down,
in the particle adhesion step, the slurry is allowed to flow down after a masking treatment of the surface of the base material excluding the surface thereof to which the zeolite particles adhere, and
in the particle adhesion step, a solvent to disperse the zeolite particles is ethanol or an aqueous ethanol solution.

19. The process for producing the zeolite film according to claim 11,
wherein the forced-air drying step is performed in humidified air,
the particle adhesion step includes a step of allowing the slurry containing the zeolite particles which become the seeds to flow down, vertically inverting the base material, and then allowing the slurry containing the zeolite particles to flow down, and in the particle adhesion step, a solvent to disperse the zeolite particles is ethanol or an aqueous ethanol solution.

20. The process for producing the zeolite film according to claim 11, wherein the forced-air drying step is performed in humidified air, the particle adhesion step includes a step of allowing the slurry containing the zeolite particles which become the seeds to flow down, vertically inverting the base material, and then allowing the slurry containing the zeolite particles to flow down, and in the particle adhesion step, a concentration of a solid content in the slurry is 1 mass % or lower.

* * * * *